June 23, 1936.　　　J. O. ALMEN ET AL　　　2,045,558
CONTROL FOR TORIC FRICTION TRANSMISSION
Filed Dec. 20, 1934　　　3 Sheets-Sheet 1

Fig. 1

Inventors
John O. Almen &
Winfield D. Gove
By Blackmore, Spencer & Fink
Attorneys June 23, 1936. J. O. ALMEN ET AL 2,045,558
CONTROL FOR TORIC FRICTION TRANSMISSION
Filed Dec. 20, 1934 3 Sheets-Sheet 3

Inventors
John O. Almen &
Winfield D. Gove
By Blackmore, Spencer & Flint
Attorneys Patented June 23, 1936

2,045,558

UNITED STATES PATENT OFFICE 2,045,558

CONTROL FOR TORIC FRICTION TRANSMISSION

John O. Almen, Royal Oak, and Winfield D. Gove, Detroit, Mich., assignors to General Motors Corporation, Detroit, Mich., a corporation of Delaware Application December 20, 1934, Serial No. 758,394

25 Claims. (Cl. 74—200)

This invention relates to mechanism for controlling ratio changes in friction race and roller transmission mechanisms. It is particularly applicable to transmission mechanism of race and roller type in which the direction of rotation of the races and rollers is reversed when the output shaft or other output element is being driven in reverse.

Major objects of the invention are to enable the ratio position of all of the rollers to be changed simultaneously and equally and all restrained to track in similar paths on the races, whether the races and rollers are being rotated in the direction of forward driving or in reverse; to initiate ratio changes during both forward and reverse driving, by inclining the rollers about axes connecting the roller centers with the points of contact of the rollers with the races, and automatically restoring the rollers to the normal stabilized position by means of two selectively actuated linkages operative respectively during forward and reverse driving.

The invention consists in ratio control means for a friction transmission mechanism of the type specified comprising races and interposed rollers adjustable to different ratio positions, and rotatable in one sense during forward driving and in the opposite sense during reverse driving, said control means including one set of actuating devices for adjusting the ratio position of the rollers during forward driving and another set for adjusting the ratio position of the rollers during reverse driving, and means for rendering one set or the other operative according to the direction of rotation of the races and rollers. It further consists in universally pivoted carriers for the rollers, and control means including one set of links connected to the carriers on one side of the roller axes and another set of links connected to the carriers on the opposite side of the roller axes and means for selectively actuating one set of links for adjusting the ratio during forward driving and the other set of links for adjusting the ratio during reverse driving. It further consists in means responding to the direction of rotation of the driving races for selecting and rendering operative that set of ratio position adjusting devices that is appropriate to the direction of rotation of the output member and simultaneously freeing the other set. It further consists in various combinations and sub-combinations for accomplishing the objects of the invention, to be disclosed fully in the detailed description following.

In the drawings, in which like parts are indicated by like reference characters throughout the several views.

The invention is illustrated in a duplex friction race and roller transmission mechanism designed to be disposed behind the rear axle of a motor vehicle and operated from an engine mounted in front of said axle through a power input shaft geared to the driving races and offset from the power output shaft; the latter is coaxial with the races and drives the rear axle shaft from its forward end. The invention however is not limited to the particular mechanism with which it is shown.

In the drawings 10 indicates a transmission casing for housing a duplex friction power transmission mechanism including two sets of races with opposed toroidal raceways and interposed rollers for transmitting rotation from one race of each set to the other race of the same set.

Fixed within the casing 10 is an inner supporting and strengthening frame comprising separated, parallel transverse members 12, 12ᵃ, rigidly united by a partially cylindrical web 14. Flanged coaxial tubular bearing elements 16 and 16ᵃ snugly fit alined holes in the members 12 and 12ᵃ, and are rigidly united thereto, as by bolts 18, 18ᵃ, passed through the flanges into said members. The inner ends of tubular bearing elements 16, 16ᵃ are spaced apart axially to admit an expansible friction clutch device to be hereafter described, and are equipped respectively with "ground trips" 17, 17ᵃ cooperating with the clutch device.

Each of the members 12 and 12ᵃ has a plurality of openings 72 arranged around the center for admitting the transmission rollers interposed between the races previously referred to. The rollers are mounted in carriers movably attached to the supporting members 12 and 12ᵃ as hereinafter explained.

Input shaft section 20, designed to transmit the power of an engine, not shown, to the transmission mechanism enters the front end of casing 10. It is assumed to rotate clockwise viewed from the left of Figs. 1 and 6. The rear end of shaft section 20 is reduced and piloted in the front end of a continuation input shaft section 20ᵃ (Fig. 6) rotatable in bearings in supporting members 12 and 12ᵃ and carrying a driving gear 22 fixed thereto between the bearings. Fixed to shaft section 20ᵃ is a hollow cylindrical clutch member 24 which extends over the rear end of shaft section 20, and is provided with internal clutch teeth 26. A reverse driving gear 28, having an integral hub like sleeve 30 equipped with external clutch teeth 32 adapted to interlock with the internal clutch teeth 26 of member 24, is slidably keyed to shaft section 20.

The output shaft is indicated by numeral 40. The front end of shaft 40 is supported in a bearing 42 seated in front wall 44 of casing 10. Forward of bearing 42 shaft 40 carries a bevel pinion 46 designed to mesh with the ring gear of a rear axle differential (not shown). A reverse gear 48 is fixed to rotate with output shaft 40 and is adapted to mesh with gear 28 slidable on input shaft section 20. Shaft 40 extends through tubular bearing elements 16, 16ᵃ and through a control tube, to be presently described, capable of limited rotary movement, disposed between the shaft and said tubular bearing elements and having bearing engagement at its ends with the shaft.

During forward driving, power is transmitted from the input shaft sections 20—20ᵃ through gear 22 to power output shaft 40, through the two halves of the duplex transmission mechanism by means now to be described.

Front and rear races 52 and 52ᵃ, having toroidal raceways, are connected to shaft 40 so that shaft and races are compelled to rotate together.

Gear 22 on input shaft section 20ᵃ meshes with a gear 60 secured to a tubular hub-like member 62, having a slightly enlarged central bore and portions projecting axially fore and aft of the gear, the inner peripheries of the projecting portions having bearing contact with the outer end surfaces of tubular bearing elements 16, 16ᵃ and the outer peripheries of said projecting portions serving as bearings on which the toroidal driving races 64, 64ᵃ are mounted. Races 64 and 64ᵃ are preferably rotated by and with gear 60 through balanced or differential devices such as rollers seated in slots in said gear and rotatable about radial axes, one of said devices being indicated at 66, Fig. 1. The races 64, 64ᵃ and gear 60 may, however, be maintained in power transmitting engagement by any suitable means.

Power transmitting rollers are interposed between the driving and driven races of each half of the transmission. There are preferably a set of three rollers 70 between driving race 64 and driven race 52 and a set of three rollers 70ᵃ between driving race 64ᵃ and driven race 52ᵃ. The carriers in which the rollers are mounted cannot revolve about the axis of the output shaft, but are so anchored on the frame work of the transmission mechanism as to allow the rollers to incline about axes joining their points of contact with the races and to tilt so as to change their tracks on the races.

As is usual in race and roller transmissions of the type shown the races may be adjusted axially in such manner as to squeeze the rollers between them in order to produce that degree of traction which is necessary to move the load. The required pressure is intended to be applied by spring and torque loading devices of any suitable construction, not shown in the drawings as they are disposed within the flange 50 and cover 56, which rotate with the race 52ᵃ, and constitute no part of this invention.

Suitable carriers for supporting and positioning rollers 70, 70ᵃ, respectively, are indicated by numeral 80. Numeral 80 is applied to the carriers in which rollers 70ᵃ as well as rollers 70 are mounted, inasmuch as all are structurally similar except that the carriers of one set are lefts and of the other rights. A description of one carrier will therefore suffice for all.

Each carier 80 is forked or U-shaped, having parallel limbs with free ends, and is moored or anchored to a supporting member 12 (or 12ᵃ) by a universal joint connected to one face of the member 12 (or 12ᵃ) near its periphery, and to the carrier at the end from which the two limbs of the forked carrier depart, and which will here be designated the base of the carrier. Each supporting member 12 (or 12ᵃ) as shown, is disposed between a driving and a driven race, and each carrier is moored to it so that the roller mounted in said carrier may rotate, incline, or tilt within one of the openings 72.

The universal joint by which each carrier 80 is moored to the supporting member 12 (or 12ᵃ) consists of an undercut spherical cavity 82 in the front, or that side of the base of the carrier which is nearest the supporting member, articulated with a spherical head 84 on a mooring pin 86 secured to the adjacent face of said supporting member. The details of structure of the universal mooring are not material to this invention and have been fully disclosed in a prior patent application.

Figure 1:
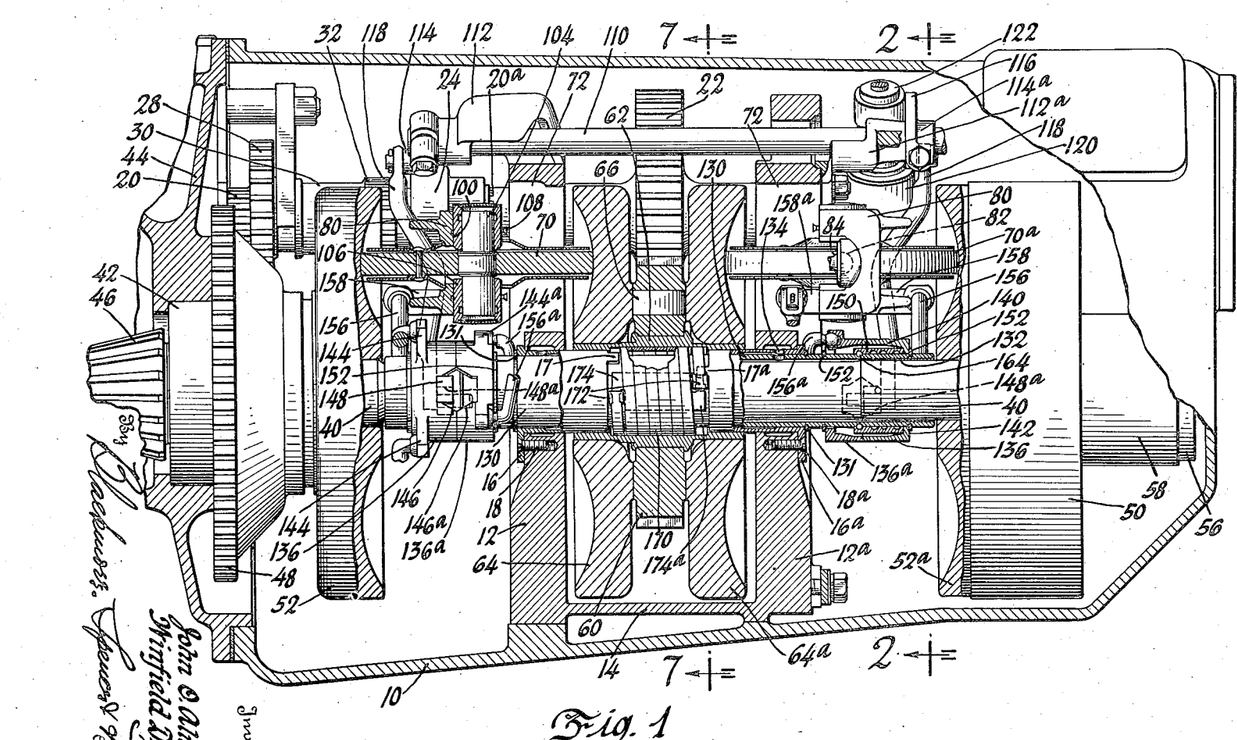
Fig. 1 is a section through the casing of a motor-vehicle transmission mechanism embodying this invention and exposing the mechanism within the casing partly in vertical longitudinal section.
Figures 6, 7, 8:
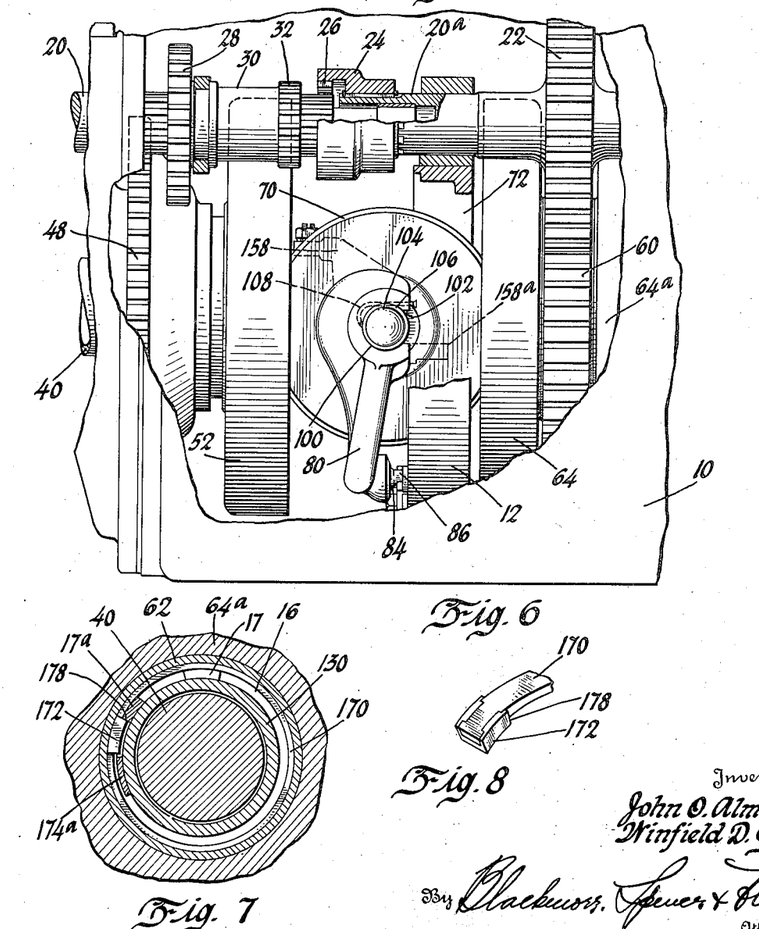
Fig. 6 is an elevation of a fragment of the transmission casing broken away to expose the mechanism within shown partly in section.
Fig. 7 is a section on line 7—7 of Fig. 1.
Fig. 8 is a detail of one end of a reversible expanding clutch spring for temporarily clutching the control sleeve to the driving races.

The parallel limbs of each carrier 80 have at their free extremities alined bearing openings 100 for the axle 104 fixed to a roller as illustrated in Figs. 1 and 6. Lateral gaps 102 in the limbs of less extent than the diameter of the openings 100 and communicating therewith permit the insertion, laterally, of the axles 104, since they are of a diameter not greater than the width of the gaps. Thereafter capped bearing bushings 106 of an external diameter to fit tightly in the openings 100, may be inserted endwise into the openings and over the ends of the axles 104 and locked in place by keys 108. The inner ends of the two alined bushings of each carrier are spaced apart a distance greater than the thickness of the rollers 70, 70ᵃ, in order to allow a limited freedom of movement of the carrier relative to the axle and the attached roller.

The two limbs of each forked carrier, are disposed with the gaps 102 toward the driving race. The roller center and center of the mooring lie in a plane normal to the axis of output shaft 40. That surface of the carrier which faces the driving race 64 (or 64ᵃ) is herein referred to as the carrier front. That side of the carrier which is adjacent a driven race is deemed to be the back. Each carrier may swing in any direction about the center of the ball headed mooring pin.

The tangential driving force of a driving race 64 or 64ª on a roller 70 or 70ª, and the tangential reaction force between a roller 70 or 70ª and a driven race 52 or 52ª, during forward driving, are exerted in a direction from the anchoring pin through the roller center so as to cause said carrier 80 to "trail", as will be apparent on inspection, keeping in mind that input shaft section 20ª during forward driving rotates clockwise viewed from the left of Fig. 6, and therefore driving races 64, 64ª rotate counterclockwise, as so viewed.

In the transmission mechanism illustrated, rearward or reverse driving is effected by disconnecting clutch jaws 26 and 32 and by meshing reverse gears 28 and 48, thereby shunting out, or by-passing, the race and roller mechanism, and driving output shaft 40 by a gear connection from input shaft 20. During reverse driving obviously the races 52 and 52ª, which rotate clockwise during forward driving (as viewed from the left of Fig. 1) when they transmit the power of the engine to the output shaft 40, are now rotating counterclockwise and are not delivering any torque except what is necessary to rotate rollers 70, 70ª, races 64, 64ª, gears 60 and 22 now rotating without transmitting torque.

During reverse driving, although there is no substantial load resisting rotation of rollers, races and gears 60 and 22, yet such tangential forces as are exerted by the races upon the rollers are also in a direction to cause the carriers 80 to "trail" as described with respect to forward driving.

The mechanism thus far described is not claimed herein. The invention of this application is involved in the means for controlling the ratio position of the rollers both in forward and reverse driving. This control means will now be described.

Figures 2, 3, 4:
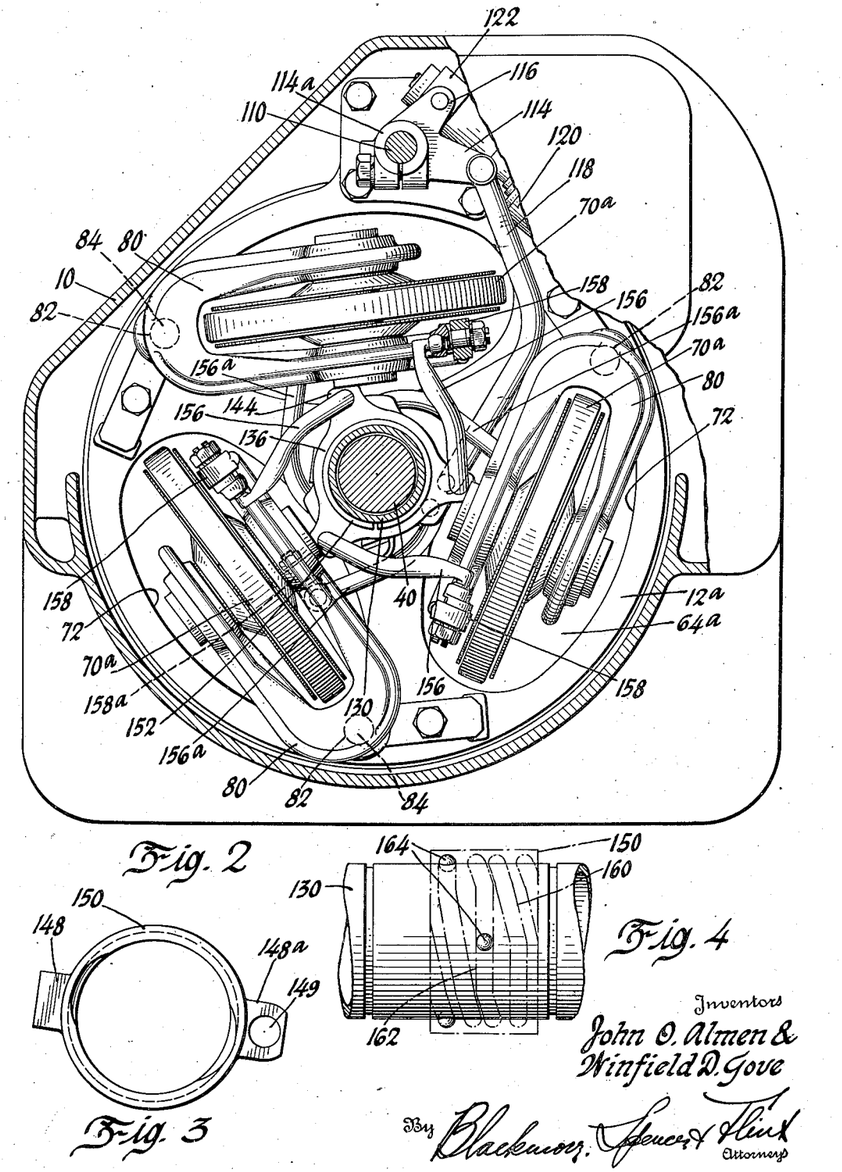
Fig. 2 is a transverse section on a plane indicated by line 2—2 of Fig. 1.
Fig. 3 is an elevation of an automatically adjustable coupling and control ring viewed in the direction of the axis of the output shaft from the rear.
Fig. 4 is an elevation of a fragment of an automatically reversible control tube, which positions the coupling and control rings, one of which is shown in dotted lines surrounding said sleeve.
Figure 5:
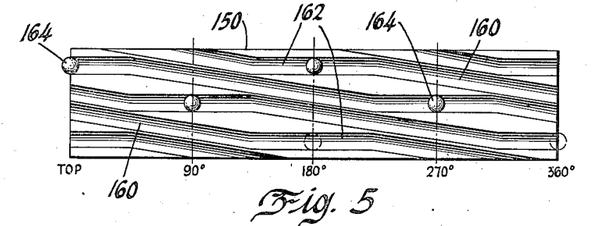
Fig. 5 is a development of the inner surface of the coupling and control ring.

In Figs. 1 and 2 numeral 110 indicates a control shaft disposed radially outward of the friction rollers and races and parallel with the axis of shaft 40, which is the main axis of the transmission. Shaft 110 is supported in a bearing bracket 112 attached to member 12 and in a bearing bracket 112ª attached to member 12ª. The ends of the control shaft extend through the bearings. To the forward end is secured an arm 114 and to the rearward end a bell crank 114ª having an arm 114, corresponding to arm 114 on the forward end, and also an arm 116. A master control link 118 is pivoted to forward arm 114 and a similar link 118 is pivoted to rearward arm 114. Master links 118 transmit motion from control shaft 110, when it is rocked, to trains of intermediate mechanism between said links and the rollers in order to effect a change in ratio position of the rollers. Rocking movement may be imparted to the control shaft by direct connection to a governor, handle, pedal or the like, or by an indirect connection through a servomechanism. In the drawings arm 116 is shown connected to the output element 122 of a servomechanism 120 of any suitable construction. For the purposes of this invention it is sufficient to say that in response to manual or governor effort the servo-mechanism imparts axial movement to the servo output element 122, which moves arm 116, thus rocking the shaft 110 and the arms 114, secured to the opposite ends, in one sense or the other according to whether a shift to high or low ratio is contemplated.

Reference has previously been made to a control tube surrounding output shaft 40 and disposed inside of tubular bearing elements 16 and 16ª. This control tube is indicated by numeral 130. Split retaining rings 131 seated in grooves in tube 130 next to the flanged ends of bearing elements 16 and 16ª assist in positioning the tube longitudinally. The ends of tube 130 are lined with bearing bushings 132 in bearing contact with shaft 40, which is slightly reduced in diameter between said bushings to admit oil. Holes 134 in tube 130 and tubular bearing elements 16, 16ª admit oil from annular grooves in the members 12 and 12ª, the oil being supplied by pressure lubricating mechanism not shown.

Sleeved over each end of control tube 130 is a pair of juxtaposed ratio control collars 136 and 136ª. These collars are cup like, and have substantially cylindrical internal surfaces merging into conical surfaces 140. Their rims are in substantial contact and both may rotate on the control tube 130 with which their bearing flanges 142 are in loose contact,—hence, capable of limited transverse movement. At the flanged end each collar 136 and 136ª is provided with three radiating lugs 144 and 144ª, respectively, for the attachment of links, the other ends of which are attached to the roller carriers by means to be described presently. Collars 136 and 136ª are provided with corresponding opposed rectangular notches 146 and 146ª having flaring entrances. Each collar has two of said notches diametrically opposed. Notches 146 and 146ª are shown at the left end of Fig. 1 on the near side in full lines and at the right of Fig. 1 on the far side in dotted lines. Said notches function as clutch dogs to engage diametrically opposite coacting dogs 148, 148ª on an automatically controlled coupling ring 150. Collars 136 and 136ª are held in place axially by snap rings 152.

Links 156 connect collar 136 with carriers 80. Links 156 are universally jointed to lugs 144 of collar 136 at one end and at the other end to arms 158 projecting from the backs of the carriers. Collars 136 and links 156 control the ratio positions of the rollers 70 (or 70ª) during forward driving.

Links 156ª universally pivoted to lugs 144ª on collar 136ª at one end and to arms 158ª projecting from the fronts of the carriers control the ratio positions of the rollers 70 (70ª) during reverse driving.

The master control links 118, respectively pivoted at one end to the arms 114 on the ends of said shaft, as previously mentioned, have their other ends respectively pivoted to the dogs 148ª on control coupling rings 150, as indicated by dotted lines in Fig. 1, at the right, each link 118 having a pin projecting at right angles therefrom into a hole 149 (Fig. 3) in dog 148ª. So it is apparent that a rocking movement imparted to control shaft 110 will rock each control coupling ring 150, and the rocking of control coupling rings 150 will correspondingly rock either ratio control collars 136 or ratio control collars 136ª, depending upon whether the dogs 148, 148ª of control coupling ring 150 are interlocked with the notches 146 or 146ª of control collars 136 or 136ª. Control coupling rings 150 are automatically coupled with control collars 136 during forward driving and with control collars 136ª during reverse driving by means to be now described.

Control tube 130 is capable of turning a partial rotation about its axis in both senses of rotation. Control couplings 150 have one or more internal grooves each groove consisting of helical portions 160 merging into circular portions 162. Bosses, preferably in the form of steel balls 164 seated in cavities in control tubes 130, engage the grooves in control coupling rings 150. The balls are so positioned with respect to the circular and helical portions of the grooves that each ball is in the same relation to the circular and helical portion of its groove as every other ball. If, for example, one ball is midway of a circular portion, the other balls are also midway of a circular portion; or if one ball is at the beginning of a helical portion, all of the others are at the beginning of a helical portion. It will be apparent that when a control coupling ring is positioned so that circular portions of the grooves engage the balls, the coupling or the tube may be rotated a limited extent without imparting axial movement to the coupling; but that when the helical portions of the grooves engage the balls rotation of the tube or coupling will cause the latter to move axially. When the balls 164 are midway of circular portions 162 of the groove or grooves the coupling 150 should be in complete engagement with either collar 136 or 136ª. In Fig. 1 it is shown in full engagement with collar 136, the end of the coupling ring engaging the conical surface 140 and centering the collar. Under this condition a rocking movement imparted to control shaft 110 will rock couplings 150 and collars 136 a partial turn and adjust the ratio position of rollers 70, 70ª.

If control tube 130 be rotated a partial rotation while coupling rings 150 are in the positions shown in Fig. 1, no movement is imparted to the coupling rings until the tube has turned far enough to engage the helical portions of the grooves with the balls, whereupon further rotation of the tube 130 tends to impart axial movement to the coupling rings. The helical grooves in the rear coupling ring 150 are pitched right handed and the helical grooves of the forward coupling ring 150 are pitched left handed. Consequently, a rotation of tube 130 counter-clockwise (as viewed from the left of Fig. 1) will tend to force rear coupling ring 150 rearward to the position shown in Fig. 1 where its dogs interlock with rear collar 136; and to force forward coupling ring 150 forward into similar engagement with forward collar 136. If the control tube be rotated clockwise the coupling rings 150 will be caused to interlock similarly with the collars 136ª. When couplings 150 are interlocked with collars 136, rocking of control shaft 110 adjusts the ratio position of rollers 70, 70ª when the drive is in the forward direction; and when said couplings 150 are interlocked with collars 136ª rocking of said shaft 110 adjusts the ratio position of rollers 70, 70ª when the drive is in reverse. It is apparent that the reverse ratio control collars 136ª are completely freed from any connection to the control shaft 110, and from any restraint with respect to rotation, when the forward drive ratio control collars are locked to the coupling rings 150 and therefore compelled to respond to any rotation of the control shaft; and that when the reverse control collars 136ª are locked to control coupling 150, the forward drive ratio control collars 136 are similarly freed.

Control tube 130 is automatically rotated in a counter-clockwise direction (as viewed from the left of Fig. 1) during forward driving until coupling rings 150 are forced axially into interlocking engagement with control collars 136, and in a clockwise direction during reverse driving until coupling rings 150 are forced in the opposite direction into interlocking engagement with control collars 136ª. The means for effecting the described automatic action will now be described.

As shown in Fig. 1, a helical clutch spring 170 encircles the central zone of control tube 130, occupying the annular space between tube 130 and the peripheral wall of the enlarged bore within hub-like member 62 which is limited in axial extent by the ends of tubular bearing elements 16, 16ª. Coiled clutch spring 170 is so tensioned, or biased, as to expand, unless forcibly contracted, into light frictional engagement with the inner surface of hub-like member 62. Each end of clutch spring 170 is furnished with a thickened end piece 172 (Figs. 1 and 8). Rigid with control tube 130, and juxtaposed to the ends of spring 170 are two spring abutments 174 and 174ª. The extremities of spring 170 are disposed normally in position to respectively thrust against the abutments 174 and 174ª. These abutments may be formed by notching or rabbeting at diagonally opposite corners a rectangular block of metal, secured to tube 130, as indicated in Fig. 1, so as to form the projecting abutments 174 and 174ª each of a length substantially equal to the width of a spring end 172.

The "ground trips" 17, 17ª on bearing elements 16, 16ª are disposed in position to engage the shoulders 178 on the respective thickened spring ends 172. The ground trips are angularly displaced one from the other sufficient to permit rotation of tube 130 enough (about 270° in the construction shown) to completely disconnect coupling rings 150 from collars 136 and connect them with collars 136ª, or the reverse, as will presently appear. Clutch spring 170 therefore functions as a two way acting automatically releasable clutch.

In Fig. 1 the transmission mechanism is shown in neutral with the forward drive controls coupled to the control shaft 110. It is to be expected that the transmission will be in low when the gear 28 is shifted into neutral; but for simplicity of illustration the transmission is shown in the drawings in 1:1 ratio. If the slidable reverse gear 28 on the input shaft of a transmission in this condition be meshed with reverse gear 48 on the output shaft, and the engine clutch engaged, the following actions will take place simultaneously, to wit: The vehicle will start backward, shaft 40 and races 52, 52ª will start to rotate counter clockwise (viewed from the left of Fig. 1), races 64 and 64ª, gear 60 and hub member 62 will start to rotate clockwise and gear 22 with shaft section 20ª will start to rotate counter clockwise,—all parts of the transmission except shaft section 20 rotating reversely of the direction of rotation in forward driving. Since hub-like member 62 now starts to turn clockwise, tending to move left hand end 172 of spring 170 away from abutment 174, and since right hand end 172 of spring 170 is pushing against abutment 174ª, the spring is forcibly expanded within hub-like member 62 and begins to rotate with it; the right hand spring end pushing against abutment 174ª rotates control tube 130 clockwise, thus withdrawing control coupling rings 150 from engagement with collars 136, releasing the ratio controls for forward driving, centering and locking collars 136ª to said couplings 150, and so connecting the control mechanism for reverse driving to the control shaft 110. Control tube 130 having rotated for enough to change the control connections as described, the shoulder 178 on left hand end 172 (as viewed in Fig. 1) of clutch spring 170 engages ground trip 17 and causes spring 170 to contract and release the frictional connection with hub-like member 62, which continues to rotate until the vehicle is stopped or reverse gear disconnected.

If now the reverse gears be disconnected and clutch elements 32 and 26 be engaged and the transmission be started in forward drive, hub-like member 62 turns counter clockwise, thereby forcibly expanding spring clutch element 170 since the lefthand end 172 (referring to Fig. 1) pushes against abutment 174 and rotates control tube 130 counter clockwise until the shoulder 178 on the right hand end of spring 170 engages ground trip 17ª, whereupon the spring 170 is contracted and released from frictional engagement with hub-like member 62. Member 62 thereafter continues to rotate while the control tube remains stationary. During rotation of the control tube counter clockwise control couplings 150 have been caused to move axially far enough to release control collars 136ª and engage and center control collars 136, thus connecting up the controls for forward driving.

Operation

Figs. 1, 2, and 6 show the mechanism in neutral since clutch elements 32 and 26 as well as gears 28 and 48 are disengaged.

It is observed, however, that couplings 150 are in engagement with ratio control collars 136 as if the transmission had been placed in neutral during or immediately following forward movement of the vehicle. In Fig. 1, therefore, the elements for effecting ratio control are related as they are during forward driving.

If now, imagining the vehicle to be traveling forward, and in gear, control shaft 110 be rocked clockwise, as viewed from the rear in Fig. 2, arms 114 and master links 118 will rotate control couplings 150 and collars 136 clockwise. Links 156 will therefore swing carriers 80 about the center of the mooring joint until the bushings 106 in the outer limbs of the carriers contact with the outer faces of the rollers. In so moving it is obvious the axes of the rollers will be inclined slightly so as to pass to one side of the axis of the output shaft 40, whereas they intersect said axis of shaft 40 during normal operating conditions. Since the driving races are now rotating clockwise (as viewed in Fig. 2 from the rear) the rollers will be steered outward in increasing spirals on the driving races 64 and 64ª and inward in diminishing spirals on the driven races 52 and 52ª and will assume a higher speed ratio position. The extent of movement of inclination imparted to the carriers 80 and roller axes is slight. When the ratio adjusting movement of shaft 110 has ceased, the pivotal points of links 156 on the arms 158 of carriers 80 become substantially fixed in space. As the rollers spiral outward on the driving races and inward on the driven races each carrier tilts about a restoration axis inclined or oblique to the planes of the races determined by the fixed center of its mooring joint and the now fixed point of connection of link 156 to arm 158, which is offset from the back of the carrier as indicated most clearly in Fig. 1. Tilting about this oblique restoration axis soon brings each roller axis to its normal position in which its extension intersects the main axis, that is, the axis of shaft 40.

Obviously, if control shaft 110 be rocked counter-clockwise (viewed as in Fig. 2) arms 114 and master links 118 will rock couplings 150 and control collars 136 counter-clockwise, inclining carriers 80 so as to point the axes of the rollers to the other side of the axis of shaft 40 thus steering the rollers in a spiral diminishing on the driving race and increasing on the driven race, thus causing them to tilt toward a lower speed ratio position. Again each carrier 80 will swing about a restoration axis inclined to the planes of the races determined by the center of the mooring point and the pivotal point of the connection between link 156 and arm 158 on the carrier. And it will be perceived that as the roller and carrier tilt around this axis the axis of the roller will be restored to a position where it points to the axis of shaft 40. When the axes of the rollers if extended intersect the axis of shaft 40 the latter are in normal driving positions and track in circles on the races, as is obvious.

While driving forward, control coupling rings 150 have been released completely from control collars 136ª as is evident. The released collars are loose on the control tube 130 and free to rotate the limited extent made necessary by the inclining and tilting movements of the rollers and their carriers, the latter being connected to the collars 136ª by the links 156ª as described.

The possible relative rotary movements of collars 136 and 136ª are small and never so great as to misaline the clutch notches 146 and 146ª sufficiently to prevent the dogs 148 and 148ª from gliding from the one notch to the other. The flaring sides of the notches will pilot the dogs 148, 148ª from one notch to the other even though in so doing some motion may be imparted to the roller carriers. In the drawings the notches are shown exactly alined when the transmission ratio is 1:1. The mechanism may be designed to have the notches alined when in low speed ratio, or in any ratio.

If now the gears 28 and 48 be meshed and input shaft connected to the engine, output shaft 40 will be rotated in reverse and the vehicle driven rearward as previously explained. Shaft 40 is now rotating counter clockwise as viewed from the left of Fig. 1, or clockwise as viewed in Fig. 2 from the rear. Control tube 130 now becomes clutched to hub-like member 62 which is being rotated counter clockwise (from the point of view of Fig. 2) and shifts control coupling rings 150 out of engagement with collars 136 into engagement with collars 136ª, completely releasing the forward drive ratio control mechanism and coupling the reverse drive control mechanism to the control shaft 110. Now, rocking shaft 110 clockwise as viewed in Fig. 2, rotates coupling rings 150 and collars 136ª clockwise; links 156ª, connecting collars 136ª to arms 158ª on carriers 80, incline the carriers and roller axes in a direction to cause the rollers to spiral outward on races 64, 64ª, since they are now rotating counter clockwise, and to spiral inward on races 52, 52ª, now being rotated clockwise by the output shaft 40. The ends of links 156ª connected to arms 158ª are fixed in space after adjusting movement of control shaft has ceased, and as the rollers tilt to new ratio positions each carrier tilts about a restoration axis determined by the center of the mooring joint and the connection of link 156ª to arm 158ª, thereby causing the roller axis, which became inclined to one side of the axis of shaft 40, to become restored to the position wherein if extended it again intersects said axis.

So, also, if control shaft 110 be rocked counter-clockwise, as viewed in Fig. 2, control collars 136a will turn counter-clockwise, and through link connections 156a to arms 158a will incline the rollers and carriers so that the rollers will now spiral inward or races 64 and 64a and outward on races 52 and 52a. As the rollers and carriers tilt to a new ratio position each carrier will tilt as before around an axis determined by the center of the mooring joint and the connecting point of link 156a to arm 158a. Thus the roller axes which are inclined to one side of the axis of shaft 40 become restored to the normal position wherein extension of the roller axes intersect the axis of shaft 40.

The restoration axes determined by the center of the mooring joint and the end of links 156 connected to the carrier when the transmission is in forward drive, and the restoration axis determined by the center of the mooring joint and the ends of links 156a connected to the carrier when in reverse are inclined oppositely with respect to the planes of the races, in order that proper restoration of inclined rollers to normal running positions may be effected in whichever sense of rotation the races may be turning.

Control shaft 110 is operated in reverse exactly the same as in forward driving. The selection of forward or reverse controls by the control tube 130, which responds automatically to the sense of rotation of the transmission mechanism renders it unnecessary to make any change in the mode of operation of the control shaft whatever the direction of drive. By the double automatically selective linkages of this invention the rollers are always kept within bounds while operating in reverse as well as when operating in forward drive and all tendency for them to run off the races or assume unequal shares of the load are repressed.

We claim:

1. In friction transmission mechanism, the combination of a race capable of rotating in either sense of rotation, a roller, the periphery of said roller being in power transmitting engagement with the race and its axis lying normally in a radial plane including the race axis and the roller center; a roller carrier; two independently operative means respectively arranged to transmit force to the carrier for moving it to cause the roller axis to move out of said radial plane, an external control device, and means for operatively connecting the latter to one or the other of said independently operative means.

2. In friction transmission mechanism, the combination of a race capable of rotating in either sense of rotation; a roller, the periphery of said roller being in power transmitting engagement with the race and its axis lying normally in a radial plane including the race axis and the roller center; a roller carrier; two independently operative means respectively arranged to transmit force to the carrier on opposite sides of the roller axis in order to incline the roller about a straight line passing through its center and the point of contact of its periphery with the race, and external control means for actuating the independently operative means.

3. In friction transmission mechanism, the combination of a race capable of rotating in either sense of rotation, a roller, the periphery of said roller being in power transmitting engagement with the race and its axis lying normally in a radial plane including the race axis and the roller center; a roller carrier, and two independently operative means respectively connected to the carrier on opposite sides of the roller axis, to incline the roller about a straight line passing through its center and the point of contact of its periphery with the race.

4. In friction transmission mechanism the combination of reversible coaxial races and interposed rollers and means for supporting each roller with its axis normally in a radial plane including the race axis and the roller center but so that the roller axis may be displaced out of said plane and in consequence the roller tilts to change its path of contact with the races; two sets of control devices arranged to operate on the means for supporting the rollers, one for displacing the roller axes during forward rotation and the other for displacing the roller axes during reverse rotation, and means responding to reversals of rotation of the transmission mechanism for rendering one set of control devices operative and the other inoperative according to the sense of rotation of the races and rollers.

5. In friction transmission mechanism having reversible coaxial toroidal races and interposed rollers, a frame, a roller carrier for each roller universally pivoted to the frame, and means for controlling the ratio position of the rollers including two sets of independently operable control elements respectively connected to each carrier on opposite sides of the roller axis.

6. In friction transmission mechanism having coaxial toroidal races and interposed rollers, a frame, a roller carrier for each roller trailing from a universal pivotal connection to the frame, means for reversing the direction of rotation of the races and rollers, and means for controlling the ratio position of the rollers including two sets of independently operable control elements respectively connected to each carrier on opposite sides of the roller axis.

7. In friction transmission mechanism having coaxial toroidal races and interposed rollers, a frame, a roller carrier for each roller universally pivoted to the frame, arms projecting laterally from each carrier on opposite sides of the roller axis, means for reversing the direction of rotation of the races and rollers, and control means including two sets of independently operable control elements respectively connected to the arms on the carriers.

8. In friction transmission mechanism having coaxial toroidal races and interposed rollers, a frame, a roller carrier for each roller universally pivoted to the frame, arms projecting laterally from each carrier on opposite sides of the roller axis, means for reversing the direction of rotation of the races and rollers, and control means including two sets of independently operable control elements including links universally pivoted respectively to the carriers at opposite sides of the roller axis.

9. In friction transmission mechanism having coaxial toroidal races and interposed rollers, a frame, a roller carrier for each roller trailing from a universal pivotal connection to the frame, arms projecting laterally from each carrier at opposite sides of the roller axis, means for reversing the direction of rotation of the races and rollers, and control means including two sets of independently operable control elements including links connected to the ends of the arms projecting from opposite sides of the carriers.

10. In friction transmission mechanism having coaxial toroidal races and interposed rollers, a frame, a roller carrier for each roller universally pivoted to the frame, means for reversing the direction of rotation of the races, control means including an external control shaft, two sets of control elements respectively connected to each carrier on opposite sides of the roller axis, and means for selectively coupling either of said sets of control elements to the external control shaft and freeing the other.

11. In friction transmission mechanism having coaxial toroidal races and interposed rollers, a frame, a roller carrier for each roller universally pivoted to the frame, means for reversing the direction of rotation of the races and rollers, and control means comprising two independently rotatable control collars coaxial with the races, links respectively universally pivoted eccentrically to each collar and to each roller carrier on opposite sides of the roller axis, and means for selectively rocking either collar and simultaneously freeing the other.

12. In friction transmission mechanism having coaxial toroidal races and interposed rollers, a frame, a roller carrier for each roller universally pivoted to the frame, means for reversing the direction of rotation of the races and rollers, and control means comprising two independently rotatable control collars coaxial with the races, means respectively connecting said control collars to each carrier on opposite sides of the roller axis, a coupling adapted to interlock with one collar or the other alternatively, and means for rocking the coupling.

13. In friction transmission mechanism having coaxial toroidal races and interposed rollers, a frame, a roller carrier for each roller universally pivoted to the frame, means for reversing the direction of rotation of the races and rollers, control means comprising two independently rotatable control collars coaxial with the races, links respectively universally pivoted eccentrically to each collar and to each roller carrier on opposite sides of the roller axis, a coupling adapted to interlock with one collar or the other alternatively and means for rocking the coupling.

14. In friction transmission mechanism having coaxial toroidal races and interposed rollers, a frame, a roller carrier for each roller trailing from a universal pivotal connection to the frame, arms projecting from opposite sides of the carrier, means for reversing the direction of rotation of the races and rollers, and control means comprising two independently rotatable control collars coaxial with the races, links respectively universally pivoted eccentrically to each collar and to the arms on each roller carrier, and means for selectively rocking either collar and freeing the other.

15. In friction transmission mechanism having coaxial toroidal races and interposed rollers, a frame, a roller carrier for each roller universally pivoted to the frame, means for reversing the direction of rotation of the races and rollers and control means comprising two independently rotatable control collars loosely mounted coaxial with the races, a coupling adapted to interlock with one collar or the other, alternatively, and cooperating means on coupling and collars for centering each collar when the coupling interlocks with it, connections between the collars respectively and the roller carriers on each side of the roller axis, and means for rocking the coupling.

16. In friction transmission mechanism having coaxial toroidal races and interposed rollers, a frame, a roller carrier for each roller universally pivoted to the frame, means for reversing the direction of rotation of the races and rollers, control means comprising a pair of oppositely facing cup-shaped collars having conoidal interior surfaces and locking dogs, a coupling arranged to enter the cavity of either collar and center it by engaging its conoidal interior surface, and provided with dogs cooperating with the dogs on the collars, to selectively interlock with either collar, a connection extending from each collar to each carrier at points respectively on opposite sides of the axis of the roller, and means for rocking the coupling.

17. In friction transmission mechanism having a race, an adjustable roller, in peripheral power transmitting engagement with the race, and a roller supporting means, control means including two sets of independently operable control elements operatively connected to the roller supporting means and arranged respectively to adjust the roller to a new ratio position dependent upon the sense of rotation of the race, an external control device, and movable coupling means responsive to the direction of rotation of the race and roller for connecting one or the other of said sets of control elements to the external control device.

18. In friction transmission mechanism having a reversible race, a roller, a frame, a roller carrier pivoted to the frame, control means including two sets of independently operable control elements respectively connected to the carrier to move it depending on the sense of rotation of the race, an external control device, and means responsive to the direction of rotation of the race for connecting one or the other of said sets of control elements to the external control device, said means comprising a rotatable actuator, a two-way clutch connected thereto, a member rotatable in one direction or the other according to the direction of rotation of the race arranged to be seized by the clutch in initial rotation thereof in either direction, and trip mechanism for releasing the clutch after a partial rotation of said actuator in either direction.

19. In friction transmission mechanism having a reversible race, a roller, a frame, a roller carrier universally pivoted to the frame, control means including two sets of independently operable control elements respectively connected to the carrier on opposite sides of the roller axis, an external control device, means for connecting one or the other of said sets of control elements to the external control device in accordance with the direction of rotation of the races and rollers, said means comprising a tubular hub-like member rotatable in one direction or the other in accordance with the direction of rotation of the race, a coiled expansion spring clutch element within the hub-like member, an actuator within the spring clutch element for connecting one or the other sets of control elements to the external control member, means on the actuator engaged by the extremities of said spring clutch element, and ground trips fixed to the frame for contracting the spring clutch and releasing it from the hub-like member after a partial rotation in either direction.

20. In friction transmission mechanism having a reversible race, a roller, a carrier therefor, independent means connected to said carrier for controlling the ratio positions of the roller during forward and reverse driving, and means for rendering one or the other of said control means operative in accordance with the direction of rotation of the race and roller, said means comprising a tubular hub-like member rotatable by the race, a control tube coaxial with the hub-like member associated with means for rendering one or the other of said control means operative according to the direction of rotation of the race, an expansible coil spring clutch element disposed between said control tube and said tubular hub-like member, abutments on the control tube at the ends of the spring clutch element, shoulders on the spring-clutch element adjacent the ends, and stationary trips arranged to engage the shoulders after a partial rotation of the control tube in either direction.

21. In friction transmission mechanism having toroidal races, interposed rollers, and universally mounted roller carriers, means for reversing the direction of rotation of the races and rollers; control means including two sets of independently operable control elements, means connecting one control element to each carrier at one side of the roller axis and means for connecting the other element to each carrier at the other side of the roller axis; movable coupling means adapted to engage one or the other control element alternatively, means for moving said coupling means into engagement with one or the other of said control elements, said coupling moving means comprising a rotating actuating member and cooperating camming elements on said coupling means and rotary actuating member.

22. A combination as defined in claim 21 in which said coupling means comprises a ring-like device having internal cam grooves and said rotary actuating member has means to engage the internal helical grooves of the coupling means.

23. A combination as defined in claim 21 in which said coupling means comprises a ring-like device having internal helical cam grooves merging into circular grooves, and said rotary actuating member has bosses engaging said grooves.

24. In a reversible, variable speed, toroidal race and roller transmission mechanism, independently operable forward and reverse drive roller-adjusting devices for changing the ratio positions of the rollers, an external control device, a coupling device connected to the external control device, automatic means for engaging said coupling device with the forward drive roller-adjusting device during forward rotation of the transmission mechanism and with the reverse drive roller-adjusting device during reverse rotation of the transmission mechanism, said automatic means comprising a rotatable control member for moving the coupling device, and means for rotating said control member in response to changes in sense of rotation of the transmission mechanism.

25. In a reversible, variable speed, toroidal race and roller transmission mechanism, comprising power input means and a power output shaft coaxial with the races; independently operable forward and reverse drive roller-adjusting means comprising adjacent collars surrounding the power output shaft, an axially movable coupling ring disposed between said collars, an external control device for rocking said coupling ring, a control tube sleeved on the output shaft, cooperating means on the control tube and coupling ring for converting rotary movement of the control tube into an axial movement of the coupling ring, and means for rotating the control tube in response to each reversal of direction of rotation of the transmission mechanism.

JOHN O. ALMEN.
WINFIELD D. GOVE.